United States Patent [19]
Goodman

[11] Patent Number: 4,529,213
[45] Date of Patent: Jul. 16, 1985

[54] BOOT STRUCTURE

[75] Inventor: C. Richard Goodman, Glendale, Ariz.

[73] Assignee: Daystar, Inc., Glendale, Ariz.

[21] Appl. No.: 530,896

[22] Filed: Sep. 12, 1983

[51] Int. Cl.³ .............................................. F16J 15/52
[52] U.S. Cl. .............................. 277/212 FB; 277/216
[58] Field of Search ...................... 188/225, 288, 297; 277/216, 212 FB, 29

[56] References Cited

U.S. PATENT DOCUMENTS

| 2,994,549 | 8/1961 | Tschappat | 277/216 |
| 3,248,955 | 5/1966 | Templeton | 277/29 |
| 3,292,520 | 9/1966 | Woolfenden | 277/216 |
| 4,447,066 | 5/1984 | Katagiri et al. | 277/212 FB |

Primary Examiner—Robert I. Smith
Attorney, Agent, or Firm—Herbert E. Haynes, Jr.

[57] ABSTRACT

An improved boot structure for protecting the extensible member and the adjacent end of a telescopically reciprocal mechanism from contamination. The boot structure includes an elongated convoluted body formed of elastomeric material with an integral band on one end thereof in which a special split-ring device is contained. The split-ring device is provided with air passages which allow the boot to breathe as it expands and contracts in response to similar movements of the telescopically reciprocal mechanism, and is configured to demountably attach the one end of the boot structure to the housing of the telescopically reciprocal mechanism.

18 Claims, 7 Drawing Figures

U.S. Patent    Jul. 16, 1985    4,529,213
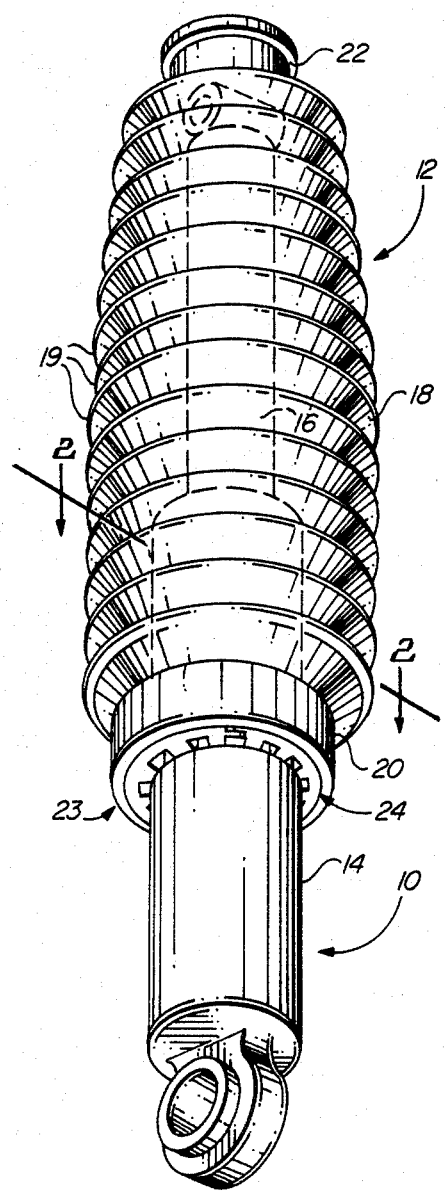
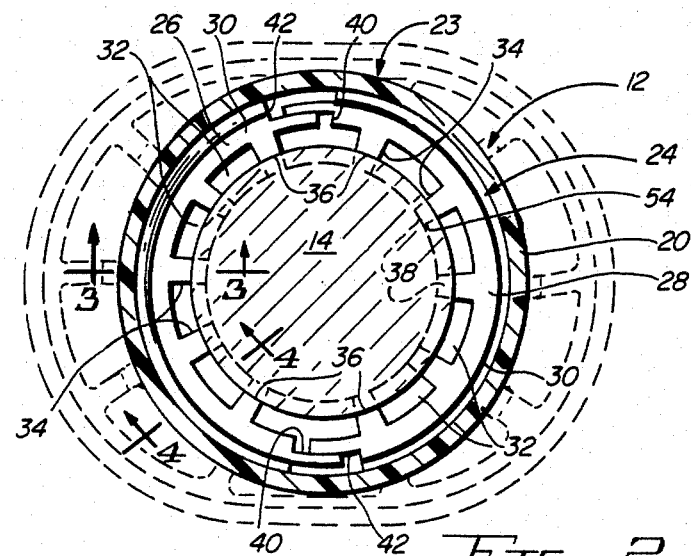
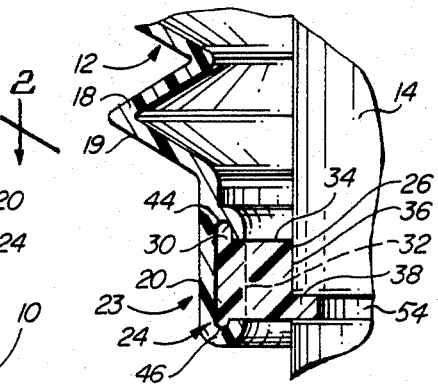
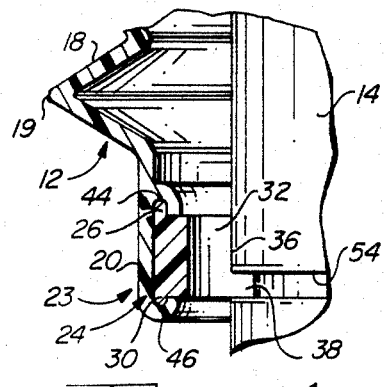
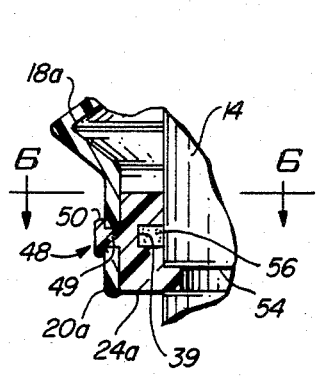
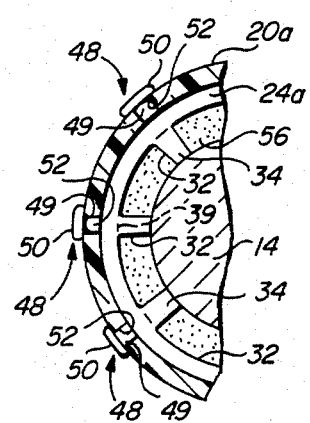
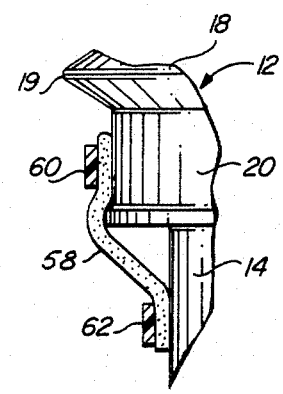

BOOT STRUCTURE

BACKGROUND OF THE INVENTION

1. Field of the Invention

This invention relates generally to contamination protective devices and more particularly to an improved boot structure of the type which protects telescopically reciprocal devices, such as shock absorbers, from contamination.

2. Description of the Prior Art

Telescopically reciprocal mechanisms, such as linear, or automotive-type shock absorbers, are subject to damage and premature failure resulting from contaminants such as sand and dirt which are carried by the axially extensible member past the seals into the housing during retracting movements of the mechanism. To prevent, or at least substantially reduce, this type of mechanism failure, contamination protective boot structures have long been employed to enclose the seal area of the housing and at least a part of the extensible member. Protective boots used for this purpose are normally formed of an elastomeric material and are generally cylindrical, or frusto-conical configuration, with one end attached to the periphery of the housing in a position which is axially set-back from the seal area end of the housing, and the opposite end of the boot is attached either to the extensible member or to the structure to which the extensible member is attached. Since the mechanism being protected is telescopically reciprocal, the protective boots are convoluted along their lengths as in a bellows to allow the boots to be axially extended and contracted along with the mechanism to which they are attached. This same requirement that the boots be capable of axial extension and contraction movements requires that the boots be capable of breathing, i.e., expelling air during retraction and intaking air during extension.

The prior art protective boot structures are attached to the telescopically reciprocal mechanism by plastic tie straps of the type sometimes referred to as cable-ties. The tie straps are circumscribingly wrapped around the ends of the boot and are tightened to seal and frictionally hold the boot in place on the telescopically reciprocal mechanism.

One problem with the tie strap attaching method is that the straps are incrementally adjustable devices and oftentimes one adjusted position will be too loose and due to the lack of sufficient compressibility at the attachment point, the tie strap cannot be tightened enough to reach the next adjustment position of the strap. The end result in a situation of this sort is that the boot is too loose and can axially move on the telescopically reciprocal mechanism.

Other disadvantages with the tie strap attaching method are from a manufacturers standpoint, in addition to the cost of the tie straps, assembling, tightening and cutting off the excess length of the strap consumes expensive assembly time. Also, the tie strap attachment method is less than ideal from a servicing and/or replacement standpoint.

The prior art protective boot structures are provided with breather holes formed at various locations in its convoluted surface. For example, in an average boot used to protect a shock absorber, a minimum of twelve breather holes are provided with each hole being about 0.150 inches in diameter. The needed breather holes weaken the structural integrity of the boot and make it impractical to provide any form of air filtration device. In that the holes are for breathing purposes, contaminants can enter into the boot as a result of normal breathing of the boot. In most situations, contaminant entry into the boot through the breather holes is not a serious problem. However, in some cases, such as when the telescopically reciprocal mechanism is used in very sandy, dusty or otherwise hostile environments, the lack of being able to provide an air filtration device or element can be a drawback.

Therefore, a need exists for a new and improved protective boot structure for use with telescopically reciprocal mechanisms which overcomes some of the problems and shortcomings of the prior art.

SUMMARY OF THE INVENTION

In accordance with the present invention, a new and improved boot structure is disclosed for use in protecting telescopically reciprocal mechanisms from damage resulting from contamination. The boot is an elastomeric tubular structure of elongated convoluted configuration with integral cylindrical bands extending axially and oppositely therefrom for mounting the boot to the telescopically reciprocal mechanism. The cylindrical band provided on one end of the boot is adapted for attachment in any suitable manner to either the extensible member of the reciprocal mechanism or to the structure to which the extensible member is attached, as determined by the type of telescopically reciprocal mechanism and the usage thereof. The opposite end of the boot structure is provided with means for simplified and improved attachment of the boot structure to the periphery of the housing of the telescopically reciprocal mechanism and to provide improved breathing capabilities for the boot structure.

The means provided on the housing connection end of the boot for improved attachment and breathing purposes is in the form of a split-ring structure which is coaxially disposed within the cylindrical band formed on the housing connection end of the boot. The split-ring defines a bore which is in circumscribing bearing engagement with the housing of the telescopically reciprocal mechanism when the boot is mounted thereon. An annular lip is formed on the split-ring so as to extend into the bore thereof for mating engagement with an annular groove formed in the housing of the telescopically reciprocal mechanism.

Since the boot is formed of an elastomeric material, the split-ring and the cylindrical band of the boot which encircles the split-ring may be circumferentially expanded which allows the housing connection end of the boot to be freely axially moved onto the periphery of the housing. When the annular lip of the split-ring is moved into alignment with the mating groove of the housing, the inherent resiliency of the cylindrical band will move the split-ring so that the annular lip will enter the groove and be held therein. In this manner, the boot is attached to the housing of the telescopically reciprocal mechanism without requiring the use of tie straps, or any other fastening devices, as was the prior art. Another advantage of the split-ring attachment device is that the split-ring and its encircling elastomeric band may be circumferentially expanded or contracted within reasonable limits which allows the boot structure to be attached to telescopically reciprocal mechanisms having housings of various diameters which fall within the reasonable limits of expansion and contraction of the housing connection end of the boot structure.

In addition to the boot attachment advantages of the above described housing connection end of the boot structure of the present invention, the split-ring is provided with axial passage means which allows the free passage of air into and out of the boot. In the preferred form, the axial air passage means includes a plurality of incrementally spaced axial slots which open inwardly into the bore of the split-ring.

Since all of the required breathing of the boot structure is accomplished through the split-ring, it is accomplished in a single area as opposed to the multiple breathing locations of the prior art. This makes it possible to use an air filtering means with the boot structure. In a first embodiment, a ring-shaped air filter is demountably placed within an annular groove that is formed in the split-ring for that purpose. The annular groove is disposed so that it transversely intersects each of the plurality of axial slots and thus, when the air filter is located in the annular groove of the split-ring, each of the axial slots will have a portion of the air filter ring disposed therein. In a second embodiment, a sheet of suitable air filtering material is circumscribingly wrapped about the housing connection end of the boot and an adjacent portion of the housing on which the boot is mounted. The sheet of air filter material is held in the wrapped around position by tie straps or other suitable fastener means.

Since the boot structure itself will adequately restrict the access of contaminants to the telescopically reciprocal mechanism in many cases, the use of the above described air filter means should only be needed when the telescopically reciprocal mechanism is to be used in an exceptionally hostile environment. In all cases, except when an air filter means is used with the boot of the present invention, the boot structure will be virtually maintenance free.

The split-ring is preferably formed as an integral part of the boot structure, such as by means of the well known insert molding technique. Otherwise, the split-ring may be suitably affixed in the bore of the cylindrical band by use of a suitable adhesive, or by use of suitable fastener means.

Accordingly, it is an object of the present invention to provide a new and improved boot structure for use in protecting telescopically reciprocal mechanisms from the deteriorating effects of contaminants.

Another object of the present invention is to provide a new and improved boot structure of the above described type which is configured to provide means for simplified and improved attachment of the boot to the housing of the telescopically reciprocal mechanism to which it is to be attached.

Another object of the present invention is to provide a new and improved boot structure of the above described character which may be attached to the telescopically reciprocal mechanism having housings of various diameters.

Another object of the present invention is to provide a new and improved boot structure of the above described character which is configured to provide means for improved breathing of the boot.

Another object of the present invention is to provide a new and improved boot structure of the above described character wherein all of the openings required for boot breathing purposes are located in a single area of the boot structure to allow an air filtering device to be used with the boot structure.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view of a typical telescopically reciprocal mechanism having the boot structure of the present invention mounted thereon.

FIG. 2 is an enlarged sectional view taken along the line 2—2 of FIG. 1.

FIG. 3 is a fragmentary sectional view taken along the line 3—3 of FIG. 2.

FIG. 4 is a fragmentary sectional view taken along the line 4—4 of FIG. 2.

FIG. 5 is a fragmentary sectional view similar to FIG. 3 and showing an alternate means of fabricating the mechanism of the present invention and a first embodiment of an air filter means which may be employed in conjunction with the boot structure of the present invention.

FIG. 6 is a fragmentary sectional view taken along the line 6—6 of FIG. 5.

FIG. 7 is a fragmentary sectional view of the housing connection end of the boot structure of the present invention and illustrating another embodiment of the air filter means which may be used in conjunction with the boot structure.

DESCRIPTION OF THE PREFERRED EMBODIMENTS

Referring more particularly to the drawings, FIG. 1 illustrates a typical type of telescopically reciprocal mechanism which is indicated generally by the reference numeral 10. The mechanism 10 is shown as being of the type commonly referred to as an automotive-type shock absorber. However, it is not intended that the present invention be limited by that particular type of structure in that the boot structure of the present invention, which is indicated in its entirety by the reference numeral 12, may be used on other telescopically reciprocal mechanisms, such as linear actuators, and the like.

As shown in FIG. 1, the mechanism 10 includes a housing member 14 having an axially extensible member 16, as is typical in all structures of this type. The boot structure 12 is mounted on the mechanism 10, as will hereinafter be described in detail, to protect the extensible member 16 and the adjacent end of the housing member 14 from the damaging effects of contamination, such as could occur if sand, dirt, detritus materials, and the like, were carried by the extensible member 16 past the seal (not shown) into the housing member 14 when the extensible member 16 is retracted.

The boot structure 12 is an elongated tubular structure formed of a suitable elastomeric material such as rubber, or suitable synthetic materials such as soft polyurethane, vinyl based compounds, and the like. Such boots are customarily fabricated by the well known injection molding or blow molding techniques.

The boot structure 12 is shown as having a body portion 18 of generally frusto-conical configuration and which is convoluted as at 19 along its length for reasons which will hereinafter be described in detail. The boot body 18 is formed with an integral relatively large diameter collar, or band, 20 which extends axially from one end thereof and a similar collar, or band, 22 of reduced diameter on its opposite end.

The reduced diameter band 22 of the boot structure 12 is appropriately sized and otherwised configured for attaching its associated end of the body 18 to either the extensible member 16 of the mechanism 10, or to the structure (not shown) to which the extending end of the extensible member 16 is to be attached, as desired and/or dictated by the installation or use requirements of the mechanism 10.

The opposite end of the boot structure 12 is especially configured to provide means for simplified attachment of that end to the housing member 14 of the mechanism 10 and to provide the boot structure 12 with improved breathing capabilities. The large diameter band 20 of the boot 12 is a part of the attachment and breathing means 23 which further includes a split-ring 24.

The split-ring 24 is preferably formed of a pair of substantially semi-circular elements 26 and 28 which may be molded or otherwise formed of any suitable heat resistant material to enable them to withstand the temperatures at which the boot body is molded therearound, and any heat which may be generated by reciprocal movements of the mechanism 10. Each of the elements 26 and 28 includes a body 30 which is arcuate along its length and in which a plurality of incrementally spaced transverse slots 32 are formed, with each of the slots being blind and opening inwardly onto the concave surface of the body 30. Thus, each of the bodies 30 is provided with an alternating series of slots 32 and slots separating lands 34. Each of the lands 34 defines an inwardly facing surface 36 with an inwardly extending lip 38 adjacent one end of the surface 36. One of the ends of each of the arcuate bodies 30 is formed with a notch 40 which opens onto the concave surface and an opposite end of each of the bodies is formed with a notch 42 which opens oppositely onto the convex surface.

The semi-circular elements 26 and 28 are assembled in diametrically opposed relationship with respect to each other to cooperatively form the split-ring 24, with the notches 40 and 42 of the element 26 being in juxtaposed overlapping disposition with respect to their lined and oppositely opening notches 40 and 42 of the other element 28. In other words, the inwardly opening notch 40 of the element 26 is in juxtaposed overlapping relationship with the outwardly opening notch 42 of the element 28, and the outwardly opening notch 42 on the opposite end of the element 26 is in juxtaposed overlapping relationship with the inwardly opening notch 40 of the element 28. It will be noted that even though the notches 40 and 42 of the elements 26 and 28 are shown in the drawings as being in engagement with each other, they need not be in actual engagement but may be spaced with respect to each other in that the only purpose for these notches is to allow the split-ring 24 to be circumferentially compressed or expanded, i.e., the elements 26 and 28 moved toward or away from each other, for reasons which will hereinafter be described in detail.

When the semi-circular elements 26 and 28 are in the above described diametrically opposed position, they cooperatively form the split-ring 24 as mentioned above. And, the elements 26 and 28 cooperatively provide the split-ring with an axial bore which is defined by the inwardly facing surfaces 36 of the lands 34, and with an inwardly extending annular lip which is defined by the lips 38 of the lands 34, with the annular lip providing the boot structure with means for demountably engaging the housing member of the mechanism 10. The split-ring is also provided with a plurality of axially extending air passage means which are, in the preferred embodiment, provided by the plural transverse slots 32 formed in the arcuate bodies 30 of the elements 26 and 28. It should be noted that the transverse slots 32 which form the axial air passage means of the split-ring 24 are the preferred embodiment and that the air passage means could take another form such as apertures (not shown) could be employed instead of the slots.

It is preferred that the split-ring 24 be molded or otherwise formed as an integral fixed part of the boot body 18. One method of accomplishing this would be to insert the elements 26 and 28 in the mold which is employed for molding the boot body so that when the boot body 18 is fabricated, the band 20 will be molded in a manner whereby the split-ring 24 is fixedly held captive by the band 20 which coaxially circumscribes the split-ring 24. Such molded affixation of the split-ring 24 within the band 20 may be accomplished in any number of ways, such as by providing each of the elements 26 and 28 with a ridge 44 which normally extends from, and along, the arcuate length of one of the planar surfaces of each of the bodies 30, and providing a similar ridge 46 on the opposite planar surface of the bodies. The ridges 44 and 46 are located proximate the convex peripheral surfaces of the elements 26 and 28, so that when the boot body 18 is molded, the convex surfaces and the ridges 44 and 46 of the elements 26 and 28 will be embeddingly encapsulated by the band 20 and thereby will become fixedly attached and integral with the band 20.

The split-ring 24 may be alternately affixed within the band 20 by means of a suitable adhesive and in this case, the ridges 44 and 46 would not be needed.

Another method for attaching the split-ring in the band is shown in FIGS. 5 and 6, wherein the split-ring 24a is provided with a plurality of projection elements 48 which are incrementally spaced about the periphery of the split-ring 24a and extend radially therefrom. Each of the projection elements 48 includes a shank portion 49 with an enlarged head 50 on its extending end. The boot body 18a of this embodiment is provided with a matchingly aligned incrementally spaced plurality of apertures 52 formed through a cylindrical band 20a thereof. When the split-ring 24a is coaxially mounted within the band 20a, each of the projection elements 48 extends through a different one of the aligned apertures 52 of the band 20a, with the heads 50 of the projection elements being in bearing engagement with the periphery of the band. Thus, the projection elements 48 of the split-ring 24a and the apertures 52 of the cylindrical band 20a form cooperating elements of an interconnecting fastener means which attaches and firmly holds the split-ring 24a in the desired position within the band 20a of the boot body 18a.

Regardless of which of the above described methods is used to mount the split-ring in the band, the attachment and breathing means 23 provided on the housing connection end of the boot structure 12 is inherently capable of being circumferentially expanded and contracted as a result of the above described expansion and contraction capabilities of the split-ring 24, and the elastic nature of the materials of which the boot body 18, and thus its integral cylindrical band 20, is formed.

To install the boot 12 on the telescopically reciprocal mechanism 10, the boot is slid axially over the extensible member 16 thereof and the attachment and breathing means 23 of the boot is circumferentially expanded, such as by hand, from its normal position, shown in solid lines in FIG. 2, to its expanded position shown in phantom lines in the same figure. When in such a circumferentially expanded state, the attachment and breathing means 23 provided on the housing connection end of the boot 12 will be freely movable into a circumscribing relationship with the periphery of the housing member 14 of the mechanism 10. When the attachment and breathing means 23 of the boot 12 is axially moved to a position wherein the housing engagement means in the form of the annular lip of the split-ring 24, which is formed by the plural lips 38 of the lands 34, is in alignment with a boot engaging means in the form of an annular groove 54, which is formed in the periphery of the housing member 14 for this purpose, the attachment and breathing means 23 is allowed to return to its normal state and the inherent resiliency of the band 20 will cause the annular lip of the split-ring 24 to enter into and be firmly held in the annular groove 54 of the housing member 14.

When the boot structure 12 is attached to the mechanism 10 as hereinbefore described, the boot body will longitudinally expand and contract in accordance with the reciprocal movements of the mechanism 10, with such longitudinal movements of the boot being made possible by the convolutions 19 which allows the boot to move in bellows-like fashion. In order for the longitudinal expansion and contraction movements of the boot 12 to be properly accomplished, the boot must breathe, i.e., expel air from within its tubular body 18 during contraction movements and intake air during its expansion movements. Such breathing is accomplished by virtue of the air passage means of the split-ring 24, and therefore all the flow of air into and out of the boot is accomplished in the area of the housing connection end of the boot structure 12.

In most cases, the amount of contaminants which are carried by the inflow of air into the tubular body 18 of the boot 12 as a result of its breathing, will be insignificant. However, in situations where the mechanism 10 is to be operated in extremely hostile environments, such as in very sandy or dusty areas, the boot structure 12 may be equipped with an air filter means.

In a first embodiment which is shown in FIGS. 5 and 6, the air filter means is in the form of a ring-shaped pad 56 which is formed of any suitable air filtering material. The pad 56 is inserted into an annular groove which is defined by slots 39 which are formed in each of the lands 34 for this purpose. In this manner, the air filter pad 56 is held in place by the slots 39 of the lands 34 and transversely extends through each of the slots 32 which define the air passage means of the split-ring, as seen best in FIG. 6.

An alternate embodiment for providing the boot structure 12 with an air filtering capability is shown in FIG. 7. When the boot structure 12 is attached to the mechanism 10 in the manner described above, a suitably configured sheet 58 of air filtering material is circumscribingly wrapped about the housing connection end of the boot structure 12 and the adjacent portion of the housing member 14 of the mechanism 10, and is secured in this position by suitable fastener means 60 and 62, such as the illustrated tie straps.

While the principles of the invention have now been made clear in the illustrated embodiments, there will be immediately obvious to those skilled in the art, many modifications of structure, arrangements, proportions, the elements, materials, and components used in the practice of the invention, and otherwise, which are particularly adapted for specific environments and operating requirements without departing from those principles.

For example, the split-ring hereinbefore described as being preferably formed of two semi-circular elements could be formed of a single circular element (not shown) which has a single radial split formed therein to allow the necessary circumferential expansion and contraction. Further, the split-ring could be demountably mounted in the band portion of the boot body, such as by providing an annular groove (not shown) on the periphery of the split-ring and a matching annular lip in the bore of the band.

The appended claims are therefore intended to cover and embrace any such modifications within the limits only of the true spirit and scope of the invention.

What I claim is:

1. A boot structure for attachment to a telescopically reciprocal mechanism which includes a housing member with a boot engaging means formed on the periphery thereof and an extensible member, said boot structure comprising:
   (a) an elongated tubular boot body of elastomeric material and convoluted along its length to allow said body to be longitudinally extended and contracted; and
   (b) attachment and breathing means on one end of said boot body and including a housing engagment means, said attachment and breathing means being circumferentially expandable to allow free axial movement thereof into circumscribing relationship with respect to the housing member of the telescopically reciprocal mechanism and circumferentially contractable for moving said housing engaging means into demountable engagement with the boot engaging means of the housing member of the telescopically reciprocal mechanism for attaching that one end of said boot body to the housing member so that said boot body will be longitudinally extended and contracted in response to similar movements of the telescopically reciprocal mechanism, said attachment and breathing means further including air passage means through which air is expelled from said boot when it is longitudinally contracted and through which air moves into said boot body when it is longitudinally extended.

2. A boot structure as claimed in claim 1 wherein said attachment and breathing means comprises:
   (a) a circular band of elastomeric material extending integrally and axially from the one end of said boot body; and
   (b) a diametrically split ring coaxially disposed within said circular band, said diametrically split ring having said housing engagement means and said air passage means formed thereon.

3. A boot structure as claimed in claim 2 wherein said diametrically split-ring defines an axial bore and said housing engagement means is an annular lip which extends radially from said split ring into the bore defined thereby.

4. A boot structure as claimed in claim 2 wherein said diametrically split ring is formed with a plurality of radially spaced slots which extends axially therethrough to provide said air passage means of said attachment and breathing means.

5. A boot structure as claimed in claim 2 wherein said diametrically split ring is integral with said circular band.

6. A boot structure as claimed in claim 2 wherein said diametrically split ring is fixedly attached to said circular band.

7. A boot structure as claimed in claim 2 wherein said diametrically split ring is demountably attached to said circular band.

8. A boot structure as claimed in claim 2 wherein said diametrically split ring comprises a pair of substantially semi-circular elements which are in diametrically opposed relationship and are movable toward and away from each other.

9. A boot structure as claimed in claim 2 and further comprising air filter means associated with said attachment and breathing means to prevent the passage of contaminants through said air passage means when said boot body is moved to its longitudinally extended position.

10. A boot structure as claimed in claim 2 wherein said diametrically split ring comprises a diametrically opposed pair of substantially semi-circular elements which are movable toward and away from each other, said pair of elements defining a bore of circumscribingly engaging the housing of the telescopically reciprocal mechanism and having an annular lip which extends into the bore for engaging the boot engaging means of the telescopically reciprocal mechanism, each of said pair of elements having a plurality of open ended slots which extend thereinto from the bore to provide said air passage means.

11. A boot structure as claimed in claim 10 and further comprising:
(a) said pair of elements cooperatively defining an annular groove which opens into the bore defined thereby; and
(b) a ring-shaped pad of air filtering material demountably positioned in the annular groove defined by said pair of elements.

12. A boot structure as claimed in claim 2 and further comprising a sheet of air filtering material for circumscribing wrapped around positioning about said attachment and breathing means and about the adjacent portion of the housing of the telescopically reciprocal mechanism when said boot structure is mounted thereon.

13. A boot structure for protecting a telescopically reciprocal mechanism from contamination comprising in combination:
(a) a telescopically reciprocal mechanism including a housing with an extensible member extending from one end of said housing, said housing having a boot engaging means formed in the periphery thereof;
(b) an elongated tubular boot body of elastomeric material and convoluted along its length to allow said boot body to be longitudinally extended and contracted, said boot body being coaxially disposed about the one end of said housing and said extensible member of said telescopically reciprocal mechanism; and
(c) attachment and breathing means on the one end of said boot body which is coaxially disposed about the one end of said housing of said telescopically reciprocal mechanism, said attachment and breathing means including a housing engaging means and being circumferentially expandable and contractable for moving said housing engaging means of said attachment and breathing means into demountable engagement with said boot engaging means of said housing of said telescopically reciprocal mechanism for attaching the one end of said boot body to said housing so that said boot body will be longitudinally extended and contracted in response to similar movements of said telescopically reciprocal mechanism, said attachment and breathing means further including air passage means through which air is expelled when said boot body is longitudinally contracted and through which air moves into said boot body when it is longitudinally extended.

14. A boot structure as claimed in claim 13 wherein said boot engaging means of said housing of said telescopically reciprocal mechanism comprises an annular groove formed in said housing.

15. A boot structure as claimed in claim 13 wherein said attachment and breathing means comprises:
(a) a circular band of elastomeric material extending integrally and axially from the one end of said boot body which is coaxially disposed about the one end of said housing of said telescopically reciprocal mechanism; and
(b) a diametrically split ring coaxially interposed between said circular band and the periphery of said housing, said diametrically split ring defining a bore which is in engagement with the periphery of said housing and having said housing engagement means and said air passage means formed thereon.

16. A boot structure as claimed in claim 15 wherein said diametrically split ring is provided with an annular lip which extends into the bore defined thereby to provide said housing engagement means of said attachment and breathing means.

17. A boot structure as claimed in claim 15 wherein said diametrically split ring is provided with a plurality of radially spaced slots which extend axially therethrough to provide said air passage means of said attachment and breathing means.

18. A boot structure as claimed in claim 15 wherein said diametrically split ring is fixedly integral with said circular band.

* * * * *